UNITED STATES PATENT OFFICE.

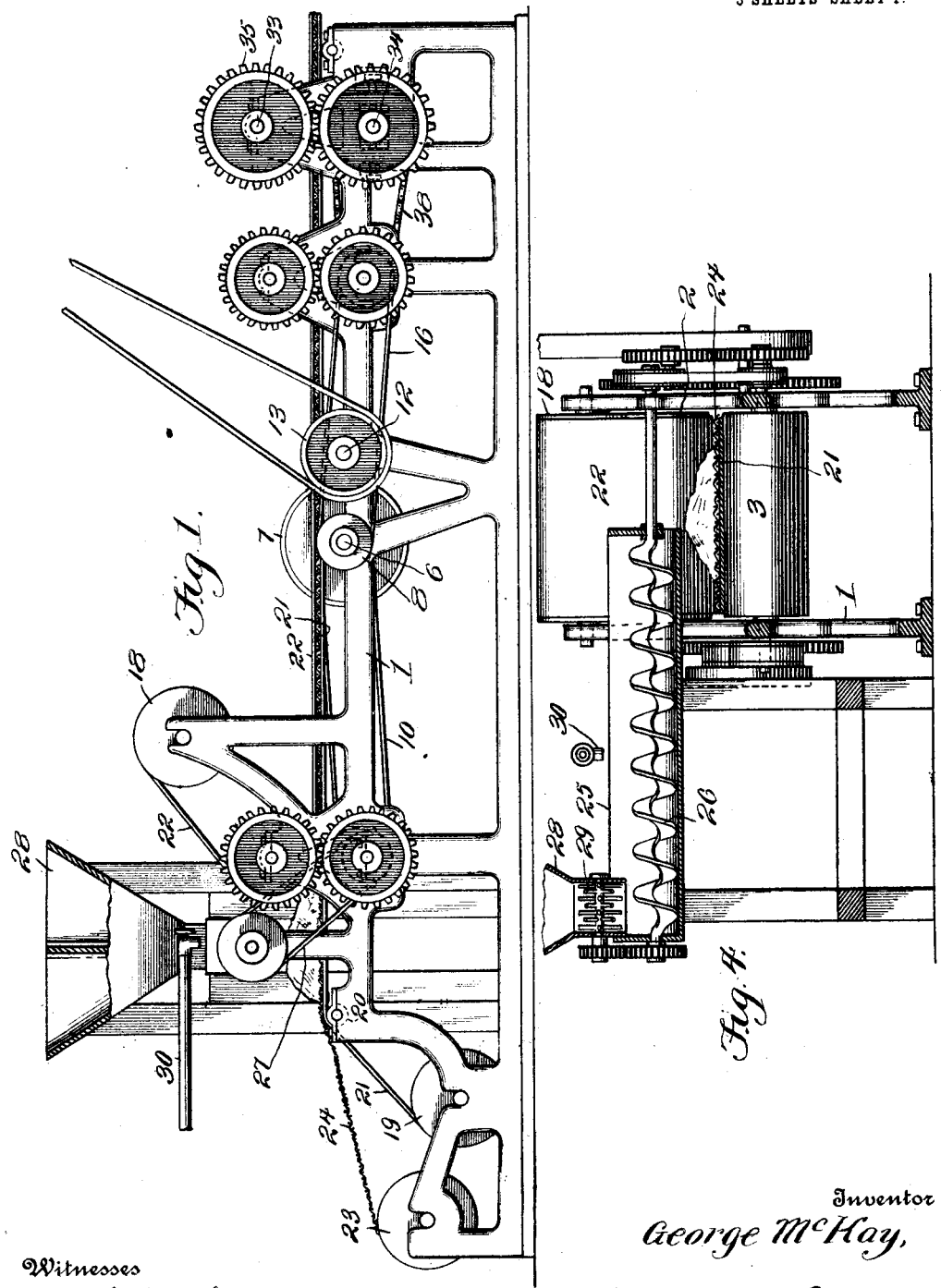

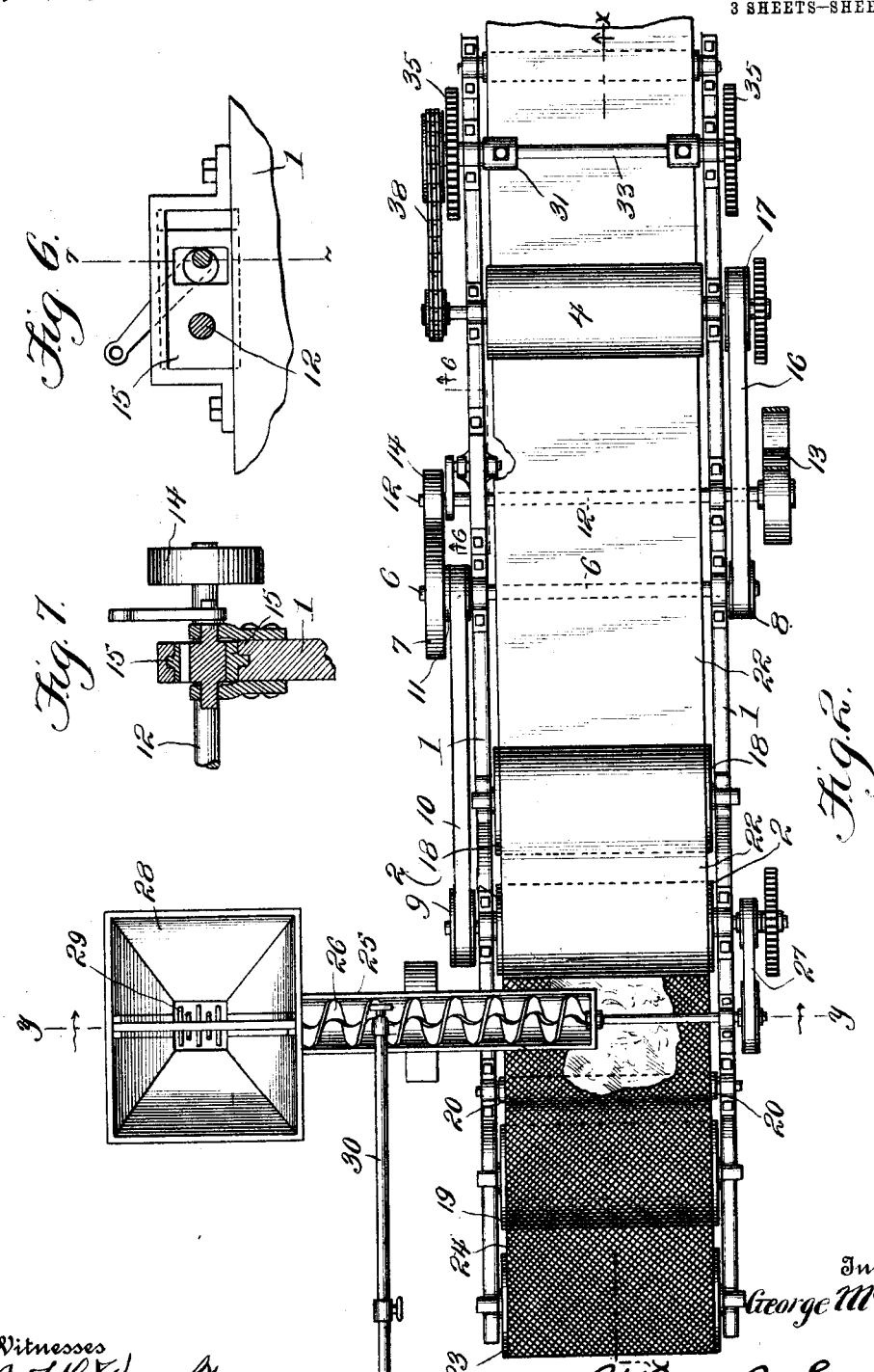

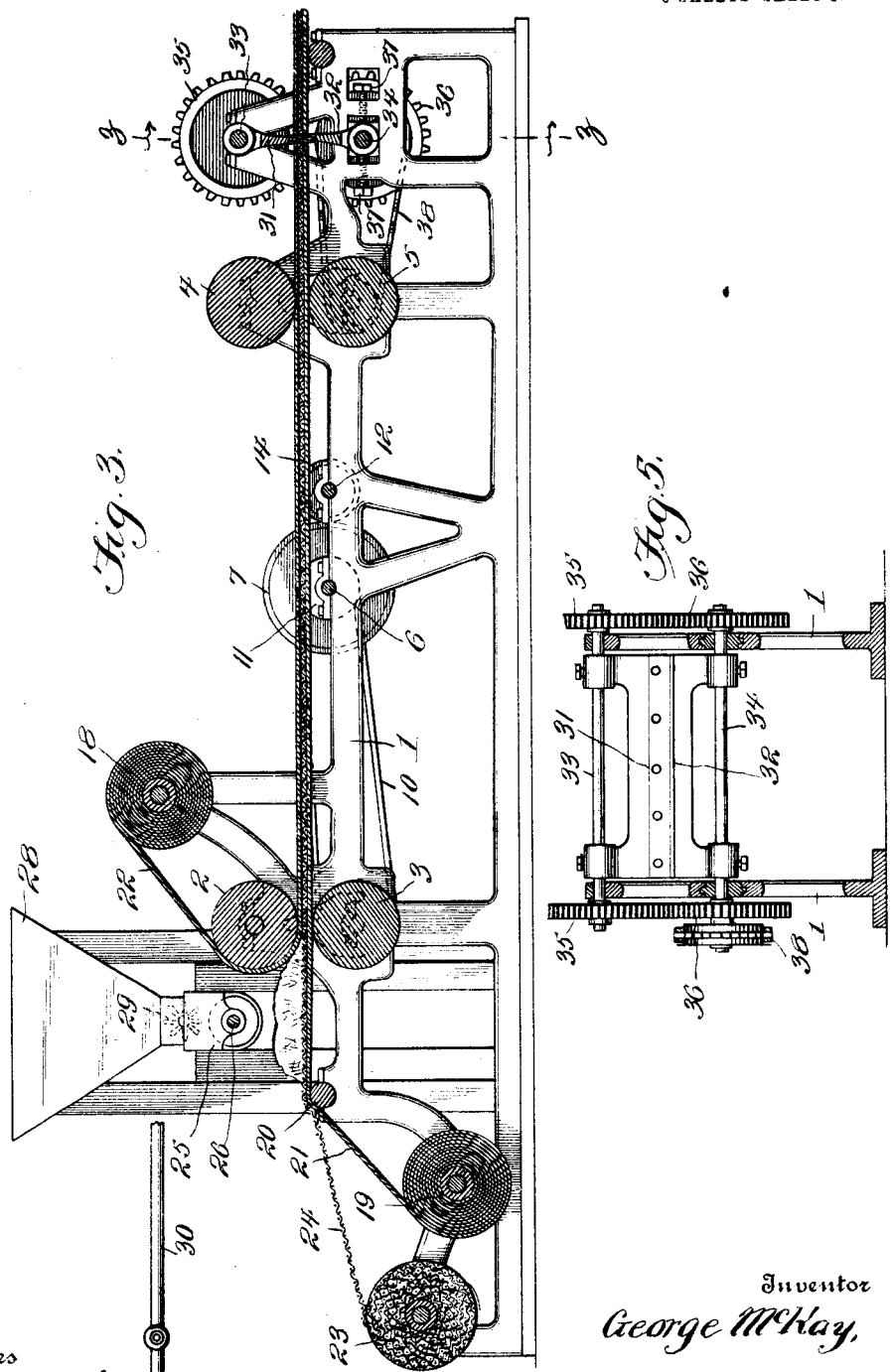

GEORGE McKAY, OF CALEDONIA, NEW YORK.

MACHINE FOR FORMING FIREPROOF COVERING FOR WALLS AND CEILINGS.

1,053,106.  Specification of Letters Patent.  Patented Feb. 11, 1913.

Application filed December 20, 1910. Serial No. 598,286.

*To all whom it may concern:*

Be it known that I, GEORGE MCKAY, a citizen of the United States, residing at Caledonia, in the county of Livingston and State of New York, have invented new and useful Improvements in Machines for Forming Fireproof Covering for Walls and Ceilings, of which the following is a specification.

This invention provides a machine for the manufacture of what is known as wall board for covering interior and exterior surfaces and which is fireproof, the machine embodying a novel structure and a minimum number of parts and adapted to turn out the board in pieces of uniform size to be conveniently handled.

The invention consists of the novel features, details of construction and combination of parts, which hereinafter will be more particularly set forth, illustrated in the accompanying drawings, and pointed out in the appended claim.

Referring to the drawings, forming a part of the application, Figure 1 is a side view of a machine embodying the invention. Fig. 2 is a top plan view of the machine. Fig. 3 is a longitudinal section on the line x—x of Fig. 2. Fig. 4 is a transverse section on the line y—y of Fig. 2. Fig. 5 is a detail view of the cutting mechanism, the supporting framework being in section on the line z—z of Fig. 3. Fig. 6 is a detail view of a portion of the main frame on the line 6—6 of Fig. 2, showing the adjustable bearing in which the movable end of the power shaft is mounted. Fig. 7 is a sectional detail on the line 7—7 of Fig. 6.

Corresponding and like parts are referred to in the following description, and indicated in all the views of the drawings, by the same reference characters.

The machine embodies a framework 1, which may be of any construction. A pair of compressing rolls 2 and 3 is located at one end of the machine and a pair of feed rolls 4 and 5 is located near the rear end of the machine. The compressing rolls 2 and 3 are connected by gears so as to revolve at a uniform speed with their inner surfaces moving rearward so as to force the material between them, thereby serving the three-fold purpose of distributing, compressing and feeding the material. A transverse shaft 6 is located between the ends of the machine and has pulleys 7 and 8 secured to opposite ends thereof. The shaft of the compressing roll 2 has a pulley 9 secured thereto which is connected by means of a drive belt 10 with a pulley 11 fastened to the shaft 6. A counter-shaft 12 has a pulley 13 at one end, which is adapted to be connected by means of a drive belt with a suitable source of power. A pulley 14, secured to the opposite end of the shaft 12, is adapted to engage frictionally with the pulley 7. The end of the shaft provided with the pulley 14 is movable toward and from the shaft 6 to throw the pulleys 7 and 14 into or out of gear. The bearing 15 receiving the movable end of the shaft 12 is eccentrically mounted so that upon turning thereof the pulley 14 is moved toward or away from the pulley 7. The feed rolls 4 and 5 are geared to rotate at a uniform speed equal to the speed of the compressing rolls 2 and 3. The completed board passes between the rolls 4 and 5 and is compressed thereby and fed forward to the cutting mechanism, said feed rolls also supplementing the action of the compressing rolls 2 and 3. A drive belt 16 connects a pulley 17 secured to the shaft of the feed roll 5 with the pulley 8 on the shaft 6.

A roll of paper 18 is located above the front portion of the machine and a second roll of paper 19 is located in advance of the machine below the plane of the compressing rolls. A roller 20 is located at the upper forward corner of the framework 1 and supports the strip of paper 21 as the same is drawn from the roll 19. The strip of paper 22 from the upper roll 18 passes around the compressing roll 2. A roll of wire 23 is located in front of the machine in a higher plane than the roll of paper 19.

In the operation of the machine the strips of paper 21 and 22 are drawn from the rolls 19 and 18 and the wire fabric is drawn from the roll 23 and passes between the strips of paper 21 and 22. The wire fabric 24 reinforces the board and gives strength thereto and also overcomes the necessity for providing supporting means intermediate the pairs of rollers between which the material passes. The material in a plastic state is fed upon the wire fabric 24 and passes through the meshes thereof and is confined between the sheets of paper 21 and 22, the wire fabric being embedded in the material and practically occupying a central position between the sheets of paper. A trough 25 extends over the wire fabric at a point between the supporting roller 20 and the pair of compressing rolls. A spiral conveyer 26 operates in the trough 25 and serves to mix the constituents comprising the material and at the same time to feed the material through the trough to the required point of use. The spiral conveyer is operated from one of the compressing rolls by means of a drive belt 27, which passes around pulleys secured to the shaft of the compressing roll and the shaft of the conveyer. A hopper 28 is located at the receiving end of the trough and comprises two compartments, one of which receives calcine plaster and the other wood fiber. An agitator 29 is located at the lower end of the hopper and serves to positively deliver the material therefrom into the trough 25. A pipe 30 supplies water to the trough in regulated quantity so as to combine with the material and form therewith a plastic mass, which is delivered upon the wire fabric approximately at a central point, said material being spread by means of the upper compressing roll.

A cutting mechanism is located at the rear of the machine and comprises two shear blades 31 and 32. The blade 31 is connected to a shaft 33 and the blade 32 is mounted upon a shaft 34. The cutting edges of the blades 31 and 32 overlap and are adapted to be adjusted to insure their coöperation in severing the completed board into lengths of predetermined size for convenience of handling. The two shafts 33 and 34 are connected at opposite ends by means of spur gears 35 and 36. One of the shafts, as 34, is mounted in bearings which are adjustable by means of set screws 37, thereby admitting of adjusting the shearing blades 31 and 32 so that their cutting edges will move the one over the other and make a clean cut of the board into the required lengths. Motion may be imparted to one of the shafts 33 or 34 from a convenient part of the machine and as indicated a sprocket chain 38 connects sprocket wheels secured to extended ends of the shafts of one of the feed rollers and shearing blades.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A machine for forming composite board, the same comprising a framework, a pair of compressing rolls near one end of the framework, a guide roller in advance of the compressing rolls arranged with its upper portion approximately in horizontal line with the space formed between the compressing rolls, a pair of feed rolls near the rear end of the framework, two shafts intermediate the pairs of compressing and feed rolls, connecting means between one of said shafts and the compressing and feed rolls, gearing between the two shafts, one of the latter having the driving power applied thereto, means for throwing it into or out of engagement with the other one of the shafts, means for supplying a strip of paper and a wire fabric to the compressing rolls, the same passing over the before mentioned guide roller, other means for supplying a strip of paper which passes around the upper one of the compressing rolls, a trough extending over the part of the wire fabric and paper strip between the guide roller and compressing rolls for supplying plastic material thereto, a hopper at the outer end of the trough for receiving the ingredients comprising the said plastic material, and a cutting mechanism near the rear end of the framework for severing the completed board into desired lengths.

In testimony whereof I affix my signature in presence of two witnesses.

GEORGE McKAY.

Witnesses:
LEROY C. KNAPP,
MALCOM M. CAMPBELL.